(12) United States Patent
Benson

(10) Patent No.: US 7,253,751 B2
(45) Date of Patent: Aug. 7, 2007

(54) METHOD FOR WRITING LANGUAGE COMPONENTS

(76) Inventor: Sherrie L. Benson, 4330 Carlow Way, Redding, CA (US) 96001

( * ) Notice: Subject to any disclaimer, the term of this patent is extended or adjusted under 35 U.S.C. 154(b) by 395 days.

(21) Appl. No.: 10/861,681

(22) Filed: Jun. 4, 2004

(65) Prior Publication Data

US 2006/0061490 A1 Mar. 23, 2006

(51) Int. Cl.
*H03K 17/00* (2006.01)
(52) U.S. Cl. .......................................... 341/22; 345/168
(58) Field of Classification Search ................ 341/20, 341/22, 200; 345/168, 169; 400/475, 486, 400/489
See application file for complete search history.

(56) References Cited

U.S. PATENT DOCUMENTS

| 1,108,660 A | 8/1914 | Anderson |
| 2,835,368 A | 5/1958 | Berkelmans |
| 2,923,393 A | 2/1960 | Berkelmans |
| 3,225,883 A | 12/1965 | Ayres |
| 3,465,865 A | 9/1969 | Parker |
| 4,765,764 A | 8/1988 | Lefler |
| 4,804,279 A | 2/1989 | Berkelmans et al. |
| 4,858,170 A | 8/1989 | DeWick, Sr. et al. |
| RE33,337 E | 9/1990 | Lefler et al. |
| 6,041,292 A | 3/2000 | Jochim |
| 6,084,576 A * | 7/2000 | Leu et al. .................... 345/168 |

* cited by examiner

*Primary Examiner*—Brian Zimmerman
*Assistant Examiner*—Hung Q Dang
(74) *Attorney, Agent, or Firm*—Theodore J. Bielen, Jr.

(57) ABSTRACT

A method for writing text employing at least one hand of a user and manipulating a keyboard having a pair of keypads which are finger depressed and a press pad which is depressed by the palm region of the hand. The first and/or second keypads are pressed simultaneously with the press pad being depressed by the palm region of the hand to generate a signal representative of a recognizable language component. Combinations of keypad and press pad signals may be compiled into a spelling table for forming words in different languages.

12 Claims, 1 Drawing Sheet

METHOD FOR WRITING LANGUAGE COMPONENTS

BACKGROUND OF THE INVENTION

The present invention relates to a novel and useful method for writing text using a keyboard.

Writing of human language has allowed the conveying of human thoughts and feelings, often expressed through speech, in a medium which is durable and transportable. That is to say, writings memorialize such thoughts and feelings.

Throughout history, writings have been used to keep accounts and record historical events. The earliest writings involve markings on physical objects, the tying of knots of various lengths and colors, stringing of beads, and the like.

Modern writing usually entails the use of a marking device on a surface such as a tablet or paper. Although modern writing techniques permit the rapid recording of speech, the speed of spoken language is normally much faster than the speed of conventional writing techniques.

Shorthand has been successfully used to record the spoken word, although special skills are required to transform spoken language into shorthand writing and to then transfer the shorthand writing into recognizable language equivalents. Also, stenographic methods using keyboards and word transcription systems have been used to record speech in courtrooms, governmental hearings, and the like. There still remains a problem of writing speech in various languages at a high transcription rate.

In the past, many devices and methods have been proposed which employ key strokes in order to record or memorialize speech. For example, U.S. Pat. No. 4,804,279 describes a typewriter which groups the vowel and consonant keys in a certain manner to increase speed of transcription. All key are pressed by the fingers of the user.

U.S. Pat. Nos. 4,858,170, RE. 33,337, and 6,041,292 describe stenographic transcribing methods using peculiar arrangements of vowels and consonants employing conventional keyboards to produce a document.

U.S. Pat. Nos. 2,835,368, 2,923,393, 3,225,883, and 4,765,764 show stenographic keyboards and machines which allow the simultaneous pressing of keys with the fingers of the user to generate consonant and vowel signals.

U.S. Pat. No. 3,465,865 shows a stenographic typewriter employing a mnemonic key in combination with conventional keys that are all pressed by the fingers of the users alone or in combination.

U.S. Pat. No. 1,108,660 illustrates a shorthand typewriting machine that employs keys, each of which represents multiple numbers and letters. All the keys are intended to be pressed by the fingers of the user.

A method for writing text using a transcription keyboard employing fingers and the frontal and/or side portions of the palm (palm regions) of the hand would be a notable advance in the field of word transcription.

BRIEF SUMMARY OF THE INVENTION

In accordance with the present invention a novel method for writing text employing the finger and palm regions of the hand is herein provided.

The method of the present invention includes employment of a transcription keyboard having at least a first keypad and a press pad. The method consists of simultaneously depressing the press pad with the palm region of one hand of the user and the keypad with a finger of the same hand of the user, simultaneously. Such simultaneous depression of the press pad and the key pad generates a signal. The signal is then transformed into at least one recognizable language component. In certain cases, the press pad may be linked to a second key pad such that the depressing of the press pad by the palm region of the one hand of the user also depresses the second key pad. Employing the palm region of the hand on a press pad, at the same with one or more keypads, allows the user to produce a word component signal which is incapable of being generated simply by using the fingers of the user.

The transformation of the signal resulting from the simultaneous compression of a press pad by the palm region of the hand and the depression of a keypad by a finger of the same hand creates in a recognizable language component representing a consonant, a word ending consonant, a vowel, a diphthong, a suffix, a prefix, and the like. All such components may be combined to produce words in various languages whether or not the user of the method of the present invention is completely familiar with such language.

In certain cases, recognizable language components may be obtained by signals generated by depression of one or more press pads depressed by the palm regions of both hands of the user. Moreover, a multitude of recognizable language components may be gleaned from the combination of a plurality of press pad depressions by the palm regions of either hand of the user and a plurality of fingers of either hand of the user. The various recognizable language components obtained from the signals produced by such combinations may be compiled into a spelling which may be employed in the practice and teaching of such method. It should be noted that the transcription keyboard employed with the method of the present invention may include keys which are elongated, or otherwise conveniently shaped, and angled in order to accommodate the simultaneous depression of the press pads by the palm regions of the hand and depression of the keypads by the fingers of the same hand.

It may be apparent that a novel and useful method for writing or transcribing text employing the finger and palm portions of at least one hand of the user has been hereinabove described.

It is therefore an object of the present invention to provide a method for writing text that increases the speed of transcription from that of a conventional stenographer keyboard.

Another object of the present invention is to provide a method for writing text employed the palm and finger portions of at least one hand of the user which allows persons having disabilities to write using the method of the present invention.

Yet another object of the present invention is to provide a method for writing text, employing finger and palm portions of at least one hand of the user, in various languages without the user being completely familiar with such languages.

A further object of the present invention is to provide a method for writing text from speech employing the finger and palm portions of at least one hand of the user which is particularly applicable to the efforts of court reporters.

Yet another object of the present invention is to provide a method for writing text, employing finger and palm portions of at least one hand of the user which entails about half the key strokes required, using conventional methods with conventional stenographic keyboards.

A further object of the present invention is to provide a method for writing text employing the finger and palm portions of at least one hand of the user which allows the writing of words prior to the establishment of a main dictionary, through the use of a spelling table.

A further object of the present invention is to provide a method for writing text employing the finger and palm portions of at least one hand of the user in which foreign proper nouns written are with ease and speed without resorting to "finger spelling".

Another object of the present invention is to provide a method for writing text employing finger and palm portions of at least one hand of the user which allows the user to write text in different languages without stopping in order to switch reference to different dictionaries or different files.

Yet another object of the present invention is to provide a method for writing text which employs the finger and palm portions of the hands of the user which may aid in the learning of a new language by the user.

The invention possesses other objects and advantages which will become apparent as the specification continues.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior delineated drawings.

Figure 1:
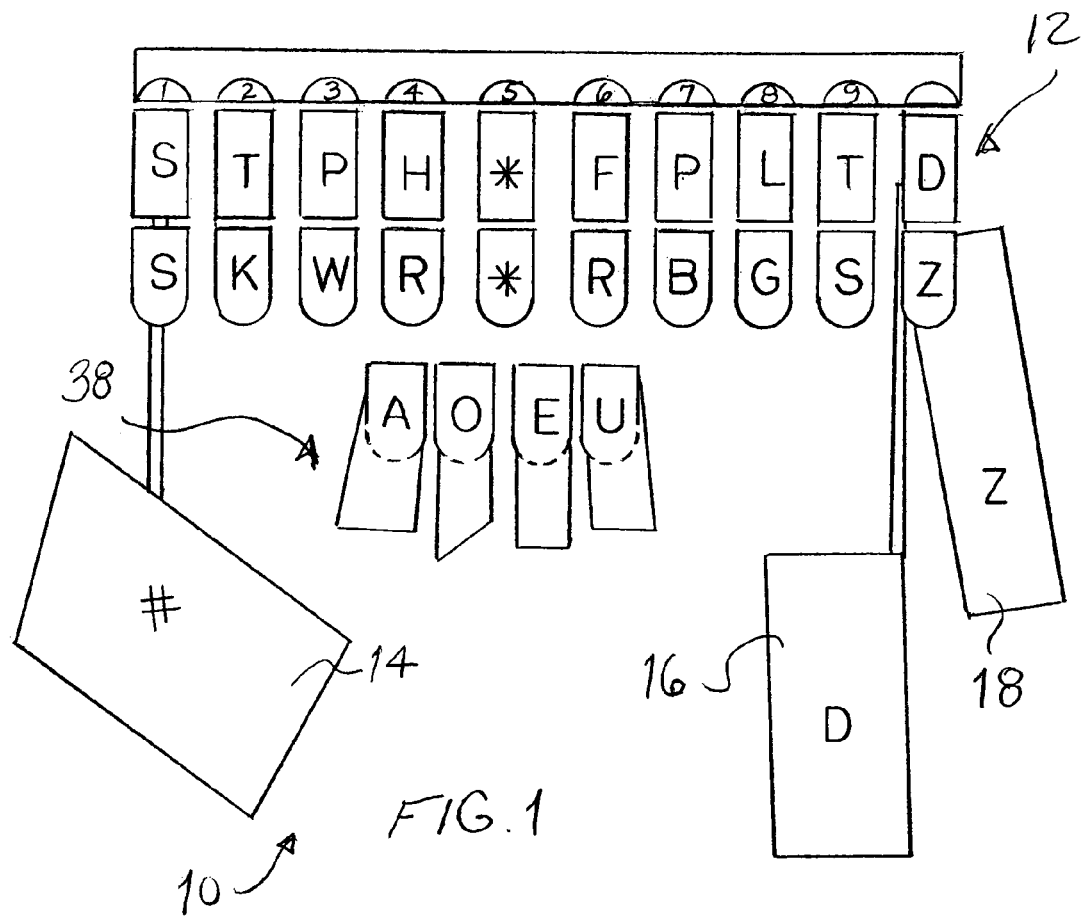
FIG. 1 is a top plan schematic view of a transcription keyboard usable with the method of the present invention.
Figure 2:
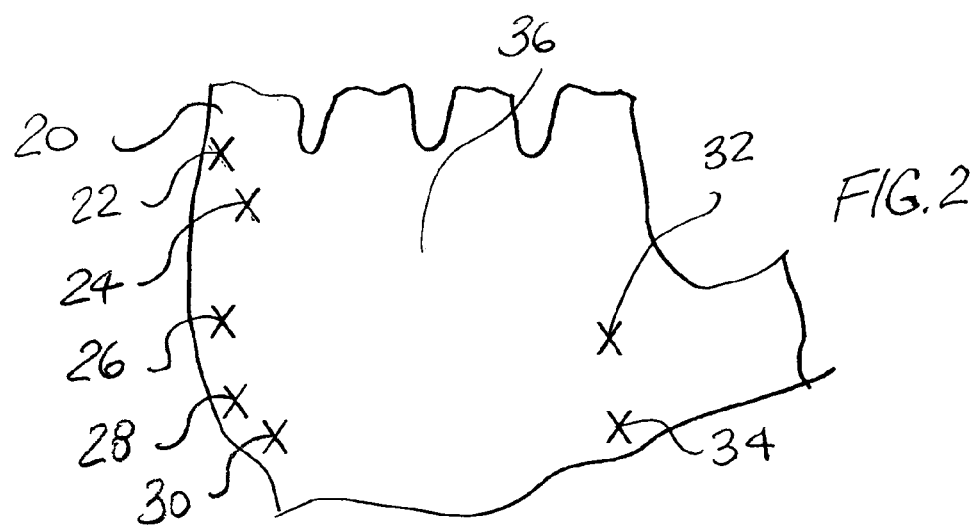
FIG. 2 is a schematic view of the palm region of the right hand of a human.

A preferred embodiment of the method may be employed with the schematically rendered physical keyboard 10 of FIG. 1. However, a virtual keyboard, such as one holographically projected on a surface, may also be employed with the method of the present invention. Keyboard 10 is similar to the keyboard shown in my U.S. patent application Ser. No. 10/732,411, which is incorporated by reference in whole hereto. The linkages and details of keyboard 10 are depicted in said patent application and will not be further discussed herein. In essence, a plurality of keypads 12 are depicted and may be identified as being arranged generally in four rows, each row beginning with "1", "ST", "SK", and "AO". It is intended that plurality of keypads 12 be depressed with the fingers of the user of keyboard 10. In addition, press pads 14, 16, and 18, identified by "#", "D", and "Z" and are linked to keypads "1", "D", and "Z", respectively. Press pads 14, 16, and 18 are intended to be depressed by the palm region 36 (front or side) of the hand. FIG. 2 schematically, partially, depicts the right hand of the user. The areas marked by X's 22, 24, 26, 28, 30, 32, and 34 approximate areas on the palm region 36 of hand 20 used to contact press pads 14, 16, and 18.

In operation, the press pads 14, 16, or 18 are pressed by the palm region of hand 20, or the left hand of the user which is a mirror image thereof, in combination with the fingers of a particular hand simultaneously contacting any selected keypad of plurality of keypads 12. It should be noted that keypads "A", "O", "E", and "U" include extended portions 38 to facilitate the simultaneous depression of any of the press pads 14, 16, and 18, by the palm region 36 of typical hand 20.

It should be realized that a large number of press pads 14, 16, or 18 and plurality of keypads 12 may be simultaneously depressed by this expedient. As with stenographic systems, combinations of keypads and press pads may be used to form language components such as words and portions of words, including beginning and ending consonants, vowels, suffixes, prefixes, diphthongs, capitalizations, punctuation marks, and the like. The system of the present invention also permits the formation of words by combining word portions in multiple languages.

For example, the palm activation of press pad 18 may signal word plurals under any standard "reporter" theory. Thus, fingers of a right hand 20 of the user may then be free to simultaneously activate any of the other of plurality of keypads 12. In addition, palm activation of press pad 16 may signal a change in word tense and again free the fingers of right hand 30 to simultaneously activate any of plurality of keypads 20. Likewise, the palm depression of press pad 14 by the left hand (not shown) of the user may signal a change in designation of all of the keypads 12, except the "D" and "Z" keypads, with conventional "reporter" software. Again, fingers of the left hand may simultaneously activate any of plurality of keypads 12.

Table I represents the actual keys used in the system of the present invention to produce some initial or beginning consonants.

TABLE I

| Actual Consonant Printout | Keypad(s) and Press Pad(s) Employed |
| --- | --- |
| B | PW |
| C | K |
| D | TK |
| F | TP |
| G | TKPW |
| H | H |
| J | SKWR |
| K | STK |
| L | HR |
| M | PH |
| N | TPH |
| P | P |
| QU or Q | KW |
| R | R |
| S | S |
| T | T |
| V | SR |

Table II shows a typical combination of keypads 12 and press pads 14, 16, and 18 employed to produce certain vowels:

TABLE II

| Actual Vowel Printout | Keypad(s) and Press Pad(s) Employed |
| --- | --- |
| A (short) | A |
| A (long) | AE |
| O (short) | O |
| O (long) | OE |
| E (short) | E |
| EE or E (long) | AOE |
| U (short) | U |
| U (long) | AOU |
| I (short) | EU |

TABLE II-continued

| Actual Vowel Printout | Keypad(s) and Press Pad(s) Employed |
|---|---|
| I (long) | AOEU |
| AI | AEU |
| EA | AO*E |
| OI | OEU |
| AU | AU |
| OU | OU |
| OA | AO* |
| EI | AO*EU |
| AE | A*E |

More complex combinations may be employed to form multi-syllabic language components which may be found in English words and words contained in languages foreign to English. Table III lists a typical combination of keypads 12 and press pads 14, 16, and 18 employed as well as ultimate words, which may be produced by employing such combinations.

TABLE III

| Actual Component Printout | Keypad(s) and Press Pad(s) Employed | Sample Ultimate Word |
|---|---|---|
| ATA | A#ET | data |
| ATO | A#UT | gato |
| ATE | A#T | date |
| ETA | O#ET | beta |
| ETO | O#UT | veto |
| ETE | #ET | Pete |
| ITA | AO#T | vita |
| ITO | AO#EUT | Ito |
| ITE | #EUT | bite |
| OTA | A#EUT | nota |
| OTO | O#EUT | Moto |
| OTE | O#T | vote |
| UTA | AO#E | Uta |
| UTO | AO#U | Muto |
| UTE | #UT | mute |

Table IV illustrates more complex press pad and keypad combinations which allow the use of many or all of the fingers of the user as well as the palm of one or more hands:

TABLE IV

| Actual Word Printout | Keypad(s) and Press Pad(s) Employed |
|---|---|
| Moto | PHO#EUT |
| Motto | PHO#EURBGT |
| Calle | KA#RBLG |
| Mario | PHA#*URBLGS |
| Marie | PHA#*RBLGS |
| Maria | PHA#*ERBLGS |

A default spelling table may accumulate by the various combinations employed using the system of the present invention. For example Table V depicts a portion of a spelling table which would result from particular keypads and press pads manipulated with respect to ending consonants and vowel-ending-consonant combinations.

TABLE V

| BB | -B |
|---|---|
| BBED | -BD |
| BBLE | -BL |
| BBLED | -BLD |
| BBLES | -BLZ |
| BT | -BT |
| RBLE | -RBL |
| LL | -L |
| LLED | -LD |
| LLS | -LZ |
| LT | -LT |
| LTS | -LTZ |
| LTED | -LTD |
| W | -FB |
| WS | -FBZ |
| WED | -FBD |
| SS | -S |
| SSES | -SZ |
| DDED | -SD |

Although Table I-V show illustrations of the present invention using languages employing the Roman Alphabet, the method of the present invention is applicable to languages employing other designations, including non-Roman alphabets.

In operation, the user depresses one or more of the press pads 14, 16, and 18 by the palm region 36 of hand 20 or the palm region of the opposite, or left, hand of the user. Simultaneously with the palm pressing of one or more of the press pads 14, 16, and/or 18, in this manner any number of the keypads 12 may be depressed by the fingers of the hand. It should be noted that there are 10 fingers available to accomplish this task. The signals generated, be they mechanical electrical infrared or the like, are transformed into recognizable language components by conventional means, which are noted in the above-identified patent application. Optimally said combination of keypads and press pads to produce all language components may be standard and taught as a method. It has been found that employing the combination of press pads 14, 16, and 18, as a group or in combination with the simultaneous depression of any one or more of keypads 12 reduces the number of strokes needed to write word components in multiple languages.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A method for writing text employing at least one hand of a user and manipulating a keyboard having at least a first keypad, a second keypad, and a press pad,
   comprising the steps:
   a. depressing the press pad with the lower palm region of the one hand of the user;
   b. depressing the first keypad with a first finger of the one hand of the user and the second keypad with a second finger of the one hand of the user simultaneously with said depressing of the the press pad by the lower palm region of the one hand of the user, said depressing of the first keypad, second keypad, and press pad generating a signal; and
   c. transforming said signal into one recognizable language component.

2. The method of claim 1 in which said step of transforming said signal results in one recognizable language component representing a consonant.

3. The method of claim 1 in which said step of transforming said signal results in recognizable language component representing one language word ending consonant.

4. The method of claim 1 in which said step of transforming said first and second signals results into one recognizable language component representing a vowel.

5. The method of claim 1 in which said step of transforming said signal results in one recognizable language component representing a diphthong.

6. The method of claim 1 in which said step of transforming said signal results in one recognizable language component representing a word suffix.

7. The method of claim 1 in which said step of transforming said signal results in one recognizable language component representing a word prefix.

8. The method of claim 1 in which said step of transforming said signal results in one recognizable language component representing a word.

9. The method of claim 1 in which said step of transforming said signal results in one recognizable language component representing a punctuation mark.

10. The method of claim 1 in which the transcription keyboard further includes a third keypad and which further comprises the steps of depressing the third keypad by a third finger of the one hand of the user, to modify said signals.

11. The method claim 1 in which the another hand of the user is employed and in which the press pad comprises a first press pad and further comprises a second press pad, and which further comprises the step of the another hand depressing the second press pad with the lower palm region of the another hand of the user simultaneously with the depression of the first press pad, first finger pad, and second finger pad by the one hand of the user, to modify said signal.

12. The method of claim 11 which further includes a third keypad and which further comprises the step of depressing the third keypad by a finger of the another hand of the user simultaneously with the depressing of the first press pad, first finger pad and second finger pad by the one hand of the user, and the second press pad by the another hand of the user, to modify said signal.

* * * * *